(12) United States Patent
Koakutsu

(10) Patent No.: US 6,902,105 B2
(45) Date of Patent: Jun. 7, 2005

(54) NEGOTIABLE INSTRUMENT PROCESSING DEVICE, NEGOTIABLE INSTRUMENT PROCESSING METHOD AND NEGOTIABLE INSTRUMENT PROCESSING SYSTEM

(75) Inventor: Naohiko Koakutsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/179,050

(22) Filed: Jun. 25, 2002

(65) Prior Publication Data
US 2003/0075596 A1 Apr. 24, 2003

(30) Foreign Application Priority Data
Oct. 22, 2001 (JP) ........................................ 2001-324122

(51) Int. Cl.[7] ............................................. G06F 17/60
(52) U.S. Cl. ...................... 235/379; 705/45; 194/205; 382/137
(58) Field of Search ................................. 194/205–213, 194/334; 382/135, 137–140; 356/4.03; 235/379; 385/135, 137–140; 358/474; 705/45

(56) References Cited

U.S. PATENT DOCUMENTS

| | | | | |
|---|---|---|---|---|
| 4,933,979 A | * | 6/1990 | Suzuki et al. ............... | 382/173 |
| 5,119,433 A | | 6/1992 | Will ............................... | 382/7 |
| 5,201,010 A | * | 4/1993 | Deaton et al. ............... | 382/139 |
| 5,221,830 A | * | 6/1993 | Kern ............................ | 705/30 |
| 5,237,620 A | * | 8/1993 | Deaton et al. ................ | 705/10 |
| 5,581,628 A | * | 12/1996 | Nakamura et al. ........... | 382/101 |
| 5,754,673 A | * | 5/1998 | Brooks et al. ............... | 382/112 |
| 5,897,625 A | * | 4/1999 | Gustin et al. .................. | 705/43 |
| 5,946,109 A | * | 8/1999 | Abe ............................ | 358/474 |
| 6,118,972 A | * | 9/2000 | Yamazaki et al. ........... | 399/370 |
| 6,363,164 B1 | * | 3/2002 | Jones et al. .................. | 382/135 |
| 6,593,962 B1 | * | 7/2003 | Downer et al. ........ | 348/211.99 |

FOREIGN PATENT DOCUMENTS

| | | |
|---|---|---|
| EP | 0 446 631 A2 | 9/1991 |
| JP | 62-284468 | 12/1987 |
| JP | 5-81401 | 4/1993 |
| JP | 5-153365 | 6/1993 |
| JP | 7-105308 | 4/1995 |
| JP | 10-23212 | 1/1998 |
| JP | 2001-134702 | 5/2001 |
| JP | 2001-143106 | 5/2001 |
| JP | 2001-283149 | 10/2001 |

* cited by examiner

Primary Examiner—Diane I. Lee
Assistant Examiner—Kumiko C. Koyama
(74) Attorney, Agent, or Firm—Mark P. Watson

(57) ABSTRACT

The size of image data for a check or other negotiable instrument used for electronically clearing payments made by such negotiable instruments is reduced. A scanning process setup command received from a host system by a communication unit is interpreted by the command interpreting unit and settings for a specified image reading area and/or cropping areas to are stored in control data storage unit. The image reading unit is controlled and driven by the scanning control unit, and an image of the negotiable instrument is read by scanning the specified image reading area. An image cropping unit extracts only the image data in the specified cropping areas.

15 Claims, 14 Drawing Sheets

| fn 63 | PARAMETER 64 | FUNCTION |
|---|---|---|
| 41 | x1 y1 x2 y2 | READING AREA SETTINGS |
| 42 | n x1 y1 x2 y2 | CROPPING AREA SETTINGS |
| 43 | n | DELETE CROPPING AREA |
| 44 | m n | SET COMPRESSION METHOD |
| 45 | | SEND READING AREA SETTINGS |
| 46 | | SEND CROPPING AREA SETTINGS |
| 47 | | SEND COMPRESSION METHOD SETTINGS |

NEGOTIABLE INSTRUMENT PROCESSING DEVICE, NEGOTIABLE INSTRUMENT PROCESSING METHOD AND NEGOTIABLE INSTRUMENT PROCESSING SYSTEM

BACKGROUND OF THE INVENTION

1. Field of the Invention

This invention relates to an apparatus, a method, and a system for capturing image data from negotiable instruments such as checks used for settling transactions.

2. Description of the Related Art

Checks and other such negotiable instruments are widely used to settle commercial transactions and to pay for purchases in stores and restaurants. This payment process is described below using checks by way of example. An account number and related information is generally printed on the face of a check as magnetic ink character data (MICR) enabling the account information to be read automatically for verification with the financial institution.

When a check is used for payment in a retail store, for example, the payee, date, and amount are printed on the face of the check after the check is verified, and the verification number, date, amount, and other endorsement information is automatically printed on the back of the check using a printer. After the store has finished processing the check, the check is typically delivered to the bank or other financial institution where the final payment process (check clearing) is completed. Electronic payment has been promoted in recent years as a way to increase the efficiency of the payment process by electronically sending the transaction data and images of the printed front and back of the check to the financial institution. The financial institution stores the received image data and magnetic ink character data captured from the check in a searchable format so that the information can be verified when a question or problem occurs.

If the image data captured from a check is large, more time is required for communicating and processing the image data, and high capacity storage devices enabling high-speed access are necessary. Using an RS-232C serial communications interface, for example, it can take several tens of seconds to transmit a 100 kilobyte image data file. This problem can be alleviated using image data compression techniques, but it is still preferable for the image data to be as small as possible.

OBJECTS OF THE INVENTION

An object of our invention is therefore to provide a negotiable instrument processing apparatus, method, and system for minimizing the data size of the image data captured from a check or other negotiable instrument during electronic payment processes.

SUMMARY OF THE INVENTION

To achieve this and other objects a negotiable instrument processing apparatus according to the present invention has an image reading unit for scanning a negotiable instrument, capturing an image thereof, and outputting image data; a reading area setting unit for setting a reading area for scanning by the image reading unit based on a first input; and a scanning control unit for controlling driving the image reading unit according to the reading area. The reading process time and data size of the resulting image data can both be reduced by thus capturing image data from the negotiable instrument by scanning only a defined reading area.

The first input could be input from a key or switch on the negotiable instrument processing apparatus, or a first control command from a host system.

Further preferably, the reading area set by the reading area setting unit is rectangular, and the reading area setting unit sets the reading area based on a starting point and ending point specified by the first input at diagonally opposite corners of the rectangle. Further preferably, the starting point and ending point specified by the first input are specified as coordinates of an orthogonal coordinate system of which a first axis is a direction of negotiable instrument movement relative to the image reading unit and a second axis is a direction orthogonal to the direction of relative movement. Because the reading area is thus rectangular, the reading area can be easily defined and set.

Yet further preferably, the negotiable instrument processing apparatus also has a size detection unit for detecting the size of the negotiable instrument, and the reading area setting unit can automatically set the reading area based on the size of the negotiable instrument detected by the size detection unit. This simplifies user operations for setting the reading area, and simplifies the reading area setting process of the host system.

Yet further preferably, the size detection unit detects at least the length of the negotiable instrument in the direction orthogonal to the direction of relative movement based on the image data output from the image reading unit. The negotiable instrument processing apparatus further preferably has a transportation unit for conveying the negotiable instrument along a transportation path; and first and second paper detection units positioned along the transportation path with a specific interval therebetween for detecting presence of a negotiable instrument in the transportation path. The size detection unit thus detects the length of the negotiable instrument in the transportation direction based on this specific interval, information relating to the transportation distance from the transportation unit, and detection information from the paper detection units.

The negotiable instrument processing apparatus of this invention preferably has a cropping area setting unit for setting at least one cropping area for capturing a part of the image data based on a second input; and an image cropping unit for capturing data within the cropping area from the image data. Further preferably, the cropping area setting unit deletes a cropping area based on a third input. The data size of the image can be further reduced in this case because only the required image data is extracted from the scanned image data and unnecessary image data is removed.

The second and third inputs can likewise be input from a key or switch of the negotiable instrument processing apparatus, or second and third control commands from the host system.

The cropping area set by the cropping area setting unit is rectangular, and the cropping area setting unit sets the cropping area based on a starting point and ending point specified by the second input at diagonally opposite corners of the rectangle. The starting point and ending point specified by the second input are specified as coordinates of an orthogonal coordinate system of which the first axis is the direction of check movement relative to the image reading unit and the second axis is the direction orthogonal to the direction of relative movement. Because the cropping area is thus rectangular, it can be easily defined and set.

A negotiable instrument processing method achieving the above object according to the present invention comprises the following steps: receiving a first input of reading area settings specifying a reading area for capturing an image of a negotiable instrument; setting the reading area based on reading area settings input in the first input step; and scanning a negotiable instrument, capturing an image thereof, and outputting image data based on the reading area set in the reading area setting step.

This method further preferably comprises the following step: detecting the size of the negotiable instrument, and the reading area setting step can automatically set the reading area based on the negotiable instrument size detected by the size detection step.

This method further preferably comprises the following steps: receiving a second input of cropping area settings specifying at least one cropping area for capturing a part of the image data output in the image reading step; setting a cropping area based on the cropping area settings input in the second input step; capturing data within the cropping area from the image data output in the image reading step.

Yet further preferably this method also comprises the following steps: receiving a third input of cropping area deletion instruction for deleting a cropping area; and deleting a cropping area based on the cropping area deletion instruction in the third input step.

A negotiable instrument processing system according to the present invention has a negotiable instrument processing apparatus and a host system controlling the negotiable instrument processing apparatus. The negotiable instrument processing apparatus has an image reading unit for scanning a negotiable instrument, capturing an image thereof, and outputting image data; a reading area setting unit for setting a reading area for scanning by the image reading unit based on a reading area setting command from the host system; a scanning control unit for controlling driving the image reading unit according to the reading area set by the reading area setting unit; a magnetic head for reading magnetic ink characters printed on the negotiable instrument; and a transmission unit for sending magnetic ink character data read by the magnetic head to the host system. The host system has a receiving unit for receiving the read magnetic ink character data; a size detection unit for determining the size of the negotiable instrument based on the read magnetic ink character data received by the receiving unit; a reading area determination unit for determining the reading area based on the negotiable instrument size identified by the size detection unit; and a reading area setting command transmission unit for generating a reading area setting command based on the reading area determined by the reading area determination unit and sending the reading area setting command to the negotiable instrument processing apparatus. This configuration enables the host system to control setting a more appropriate reading area.

A further negotiable instrument processing method comprises the following steps: on the negotiable instrument processing apparatus side, receiving from the host system a reading area setting command specifying a reading area for capturing an image of a negotiable instrument; setting the reading area based on the reading area setting command received in the reading area setting command receiving step; scanning a negotiable instrument, capturing an image thereof, and outputting image data according to the reading area set in the reading area setting step; reading magnetic ink characters printed on the negotiable instrument; and sending the magnetic ink character data read in the magnetic ink character reading step to the host system. On the host system side this negotiable instrument processing method comprises the following steps: receiving the read magnetic ink character data; determining a size of the negotiable instrument based on the read magnetic ink character data received in the receiving step; determining the reading area based on the negotiable instrument size identified by the size detection step; and generating a reading area setting command based on the reading area determined by the reading area determination step and sending the reading area setting command to the negotiable instrument processing apparatus. This enables efficient image data capturing.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
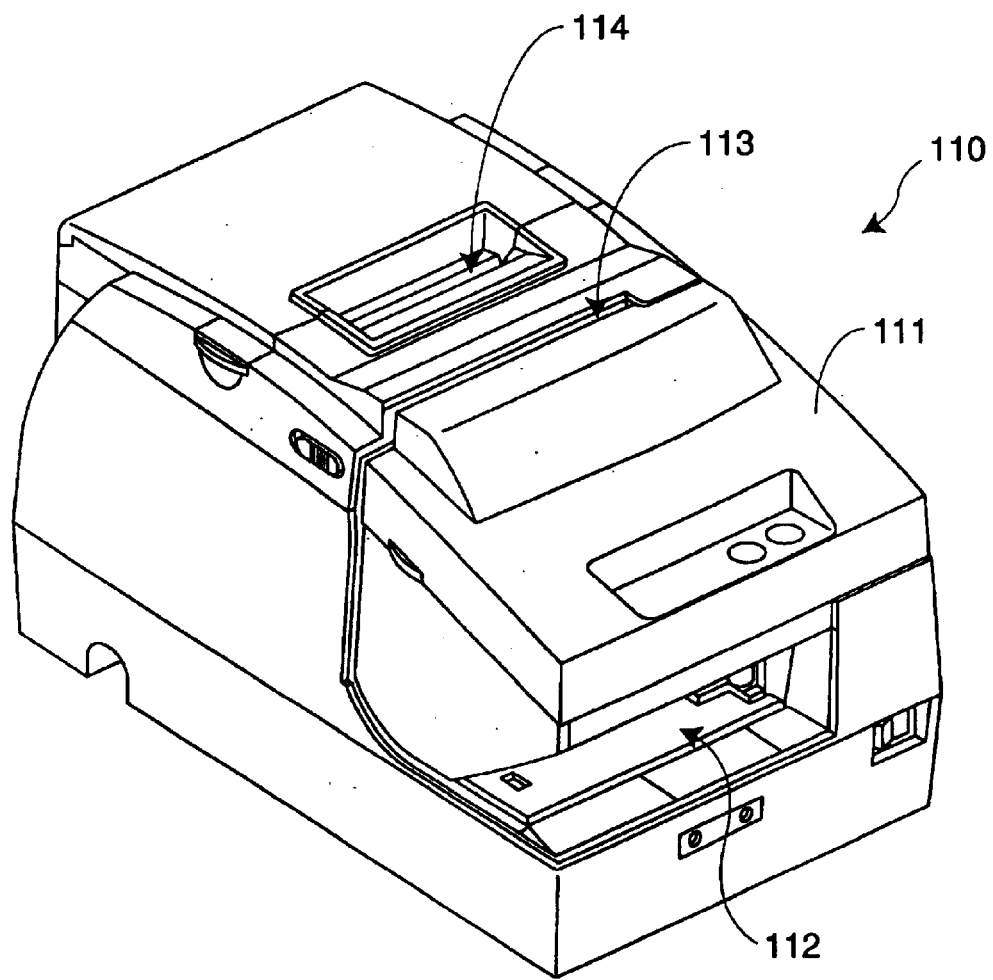
FIG. 1 is a perspective view of a check processing apparatus according to a preferred embodiment of this invention.

A preferred embodiment of the present invention is described below with reference to the accompanying figures. FIG. 1 is a perspective view of a check processing apparatus according to a preferred embodiment of this invention. As shown in the figure, the check processing apparatus 110 is covered by a plastic cover 111, has an insertion opening 112 at the front for manually inserting a check, and has a check exit 113 from which the check is ejected from the top. This check processing apparatus 110 also has a roll paper housing unit (not shown in the figure) for storing roll paper at the back part. Roll paper is stored in the roll paper housing unit, pulled therefrom, passed through the printing unit, and ejected from a roll paper exit 114 in the top of the check processing apparatus.

Figure 2:
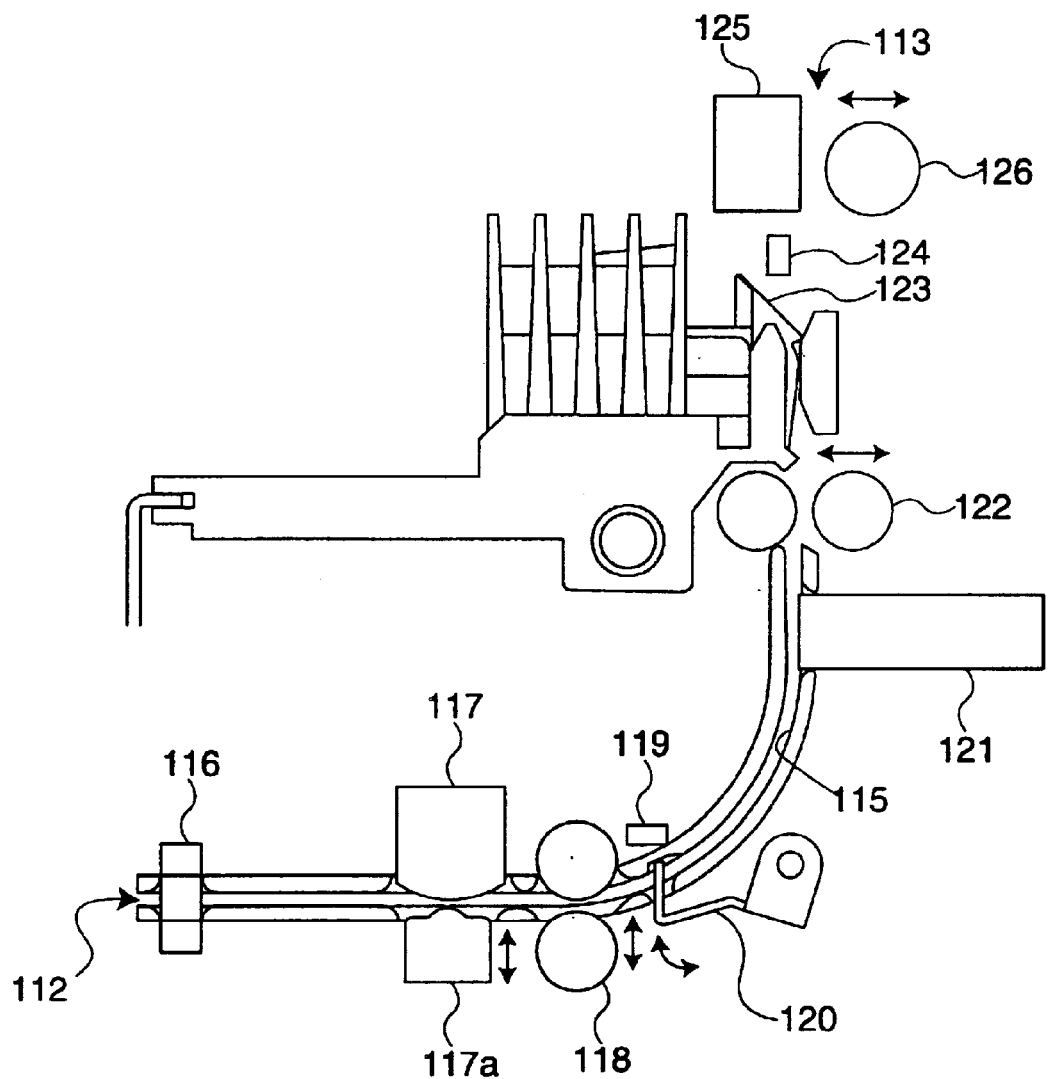
FIG. 2 is a side sectional view showing the internal structure of the check processing apparatus.

FIG. 2 is a side sectional view showing the internal structure of the check processing apparatus. As shown in FIG. 2 a check transportation path 115 is formed inside the check processing apparatus 110 and extends from the insertion opening 112 to the check exit 113. When seen from the side, the check transportation path 115 curves in an L-shape with the insertion opening 112 side horizontally oriented and the check exit 113 side vertically oriented. Positioned along the check transportation path 115 in order from the insertion opening 112 side are a form trailing edge detector 116, magnetic head 117, first feed roller pair 118, form leading edge detector 119, form positioning member 120, back print head 121, second feed roller pair 122, front print head 123, form ejection detector 124, scanner 125, and scanner feed roller 126 opposite the scanner 125.

The form trailing edge detector 116, form leading edge detector 119, and form ejection detector 124 are, for example, transmitting or reflecting type photodetectors enabling non-contact detection of the presence of a check at various positions along the check transportation path 115.

The form positioning member 120 temporarily stops a check inserted from the insertion opening 112 at a specific position, and is configured so that it can be changed by driving a solenoid or other type of actuator between a position where the actuator projects into and closes the check transportation path 115 and a position where the actuator is retracted from and opens the check transportation path 115.

The first feed roller pair 118 and second feed roller pair 122 are pairs of roller members positioned so that the rollers of each pair are on opposite sides of the check transportation path 115. A check can be transported in forward and reverse directions by appropriately driving one of the rollers. One roller in each pair can also be freely retracted from or advanced toward the other roller member so that the check transportation path 115 can be opened or closed by driving a solenoid or other actuator to appropriately retract or advance the rollers.

Figure 3:
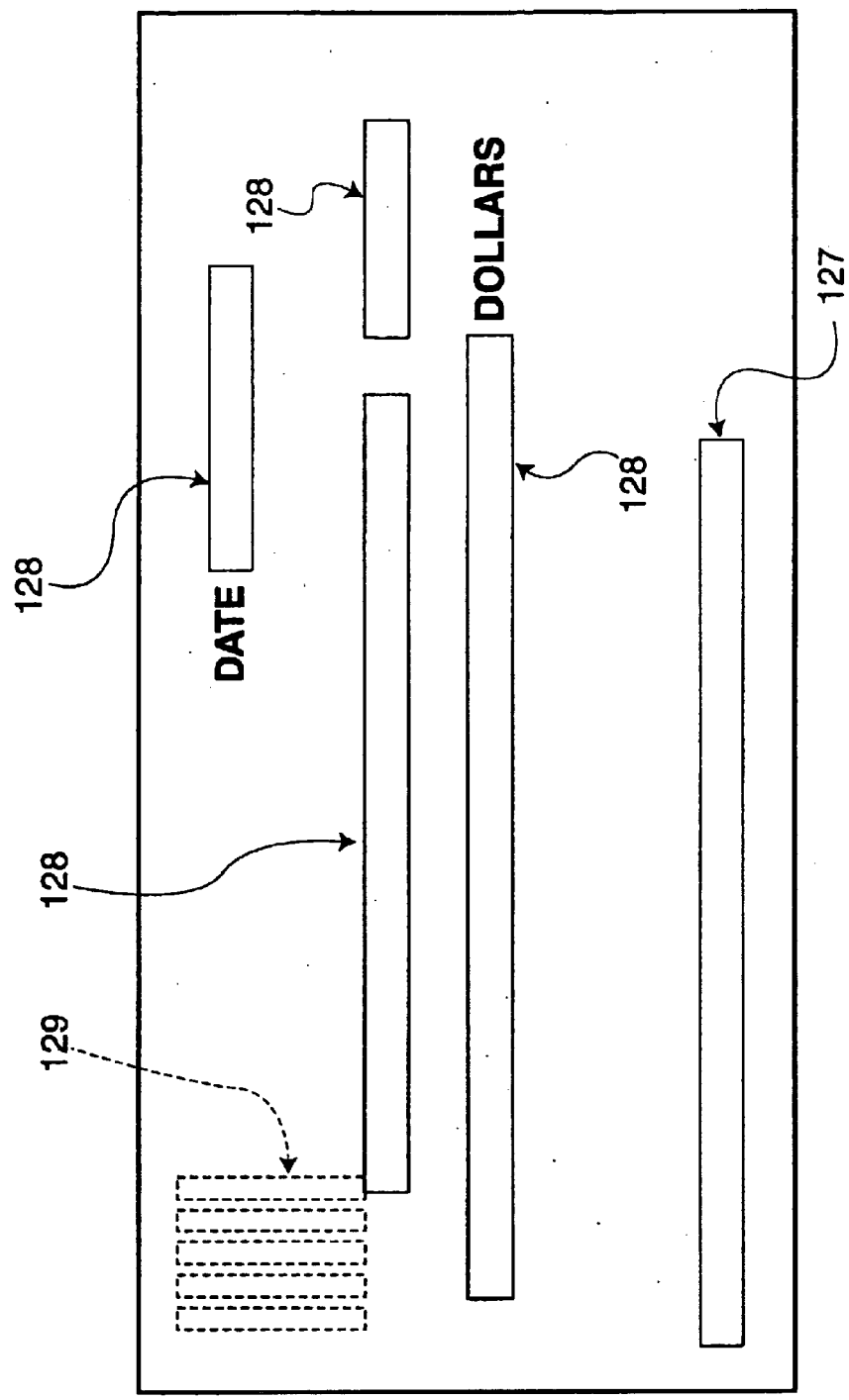
FIG. 3 shows the layout of a typical check.

The magnetic head 117 is used to read the magnetic ink characters printed on the check face. Whether a check is valid or not is determined based on the data read by the magnetic head 117. As shown in FIG. 3, the magnetic ink characters are printed in a specific magnetic ink character recording area 127 on the front of the check, and record the checking account number and other information. A pressure member 117a for pressing a check against the magnetic head 117 for magnetic ink character reading is positioned opposite the magnetic head 117, but is normally retracted from the magnetic head 117 so that the check transportation path 115 is open during all operations other than magnetic ink character reading.

The front print head 123 is used for printing the payee, date, amount, and other check face data on the front of the check. This data is printed on the face printing areas 128 shown in FIG. 3. The front print head 123 is a serial print head supported on a carriage for printing a dot matrix of one or multiple columns while travelling widthwise over the check. A dot impact type print head for transferring ink from an ink ribbon to the check is used as the front print head 123 in this preferred embodiment, but other types of print heads can alternately be used.

The back print head 121 is used for printing a customer verification number, date, amount, and other information required for endorsement by the store to the back of the check. This endorsement data is printed on an endorsement printing area 129 as shown in FIG. 3. The back print head 121 is a shuttle head having multiple heads spaced at specific intervals widthwise to the check, each head printing a dot matrix of one or more columns by movement of the head within the width of this specific interval. A dot impact type print head for transferring ink from an ink ribbon to the check is used as the back print head 121 in this preferred embodiment of the invention, but other types of heads can alternately be used.

The scanner 125 scans the face of a printed check. The scanned image data is sent to and stored in a host computer 200 (FIGS. 4 and 7) and used for electronic payments and electronic payment verification. The scanner 125 in this embodiment is a contact image sensor (CIS) capable of generating a 256-level gray scale image, and scans with the check pressed against the scanning surface thereof.

The scanner feed roller 126 transports the check for the scanning operation, and presses the check against the scanning surface of the scanner 125 while transporting it toward the check exit 113. When not scanning, the scanner feed roller 126 retracts from the scanner 125 so that the check transportation path 115 is open. During the scanning operation the check is transported upward by the scanner feed roller 126 while the scanner 125 scans the check, and the check is then ejected from check exit 113. After the check is transported to the scanning start position by the first feed roller pair 118 and second feed roller pair 122 in the scanning operation, retraction of the scanner feed roller 126 is cancelled so that the check is pressed against the scanner 125 while the scanner feed roller 126 is driven to transport the check over the scanner 125 surface while it is scanned.

Figure 4:
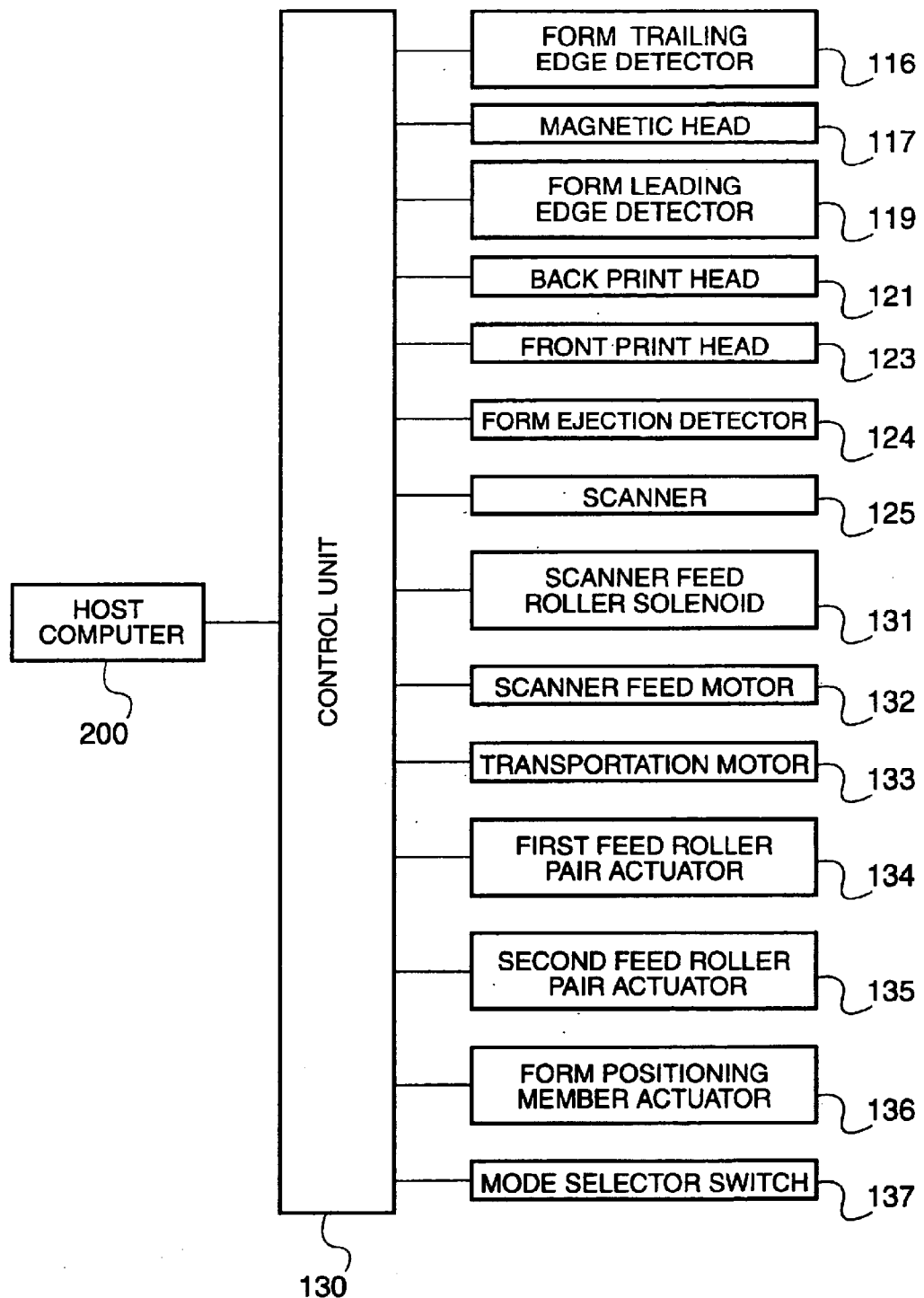
FIG. 4 is a block diagram of the controller inputs and outputs.

FIG. 4 is a block diagram of the controller inputs and outputs. As shown in FIG. 4, the check processing apparatus 110 has a control unit 130 comprising a CPU, ROM, RAM, and other devices. In addition to the above-described trailing edge detector 116, magnetic head 117, leading edge detector 119, back print head 121, front print head 123, form ejection detector 124, and scanner 125, the control unit 130 controls a scanner feed roller solenoid 131 for moving the scanner feed roller 126 to open and close the form transportation path; a scanner feed motor 132 for driving the scanner feed roller 126; a transportation motor 133 for driving the first feed roller pair 118 and second feed roller pair 122; first feed roller pair actuator 134 for opening and closing the first feed roller pair 118; second feed roller pair actuator 135 for opening and closing the second feed roller pair 122; form positioning member actuator 136 for moving the form positioning member 120 to opened and closed positions; and mode selector switch 137 for selecting a first process control mode (with scanning) or a second process control mode (without scanning). The control sequence of the first process control mode run by the control unit 130 is described below.

Figure 5:
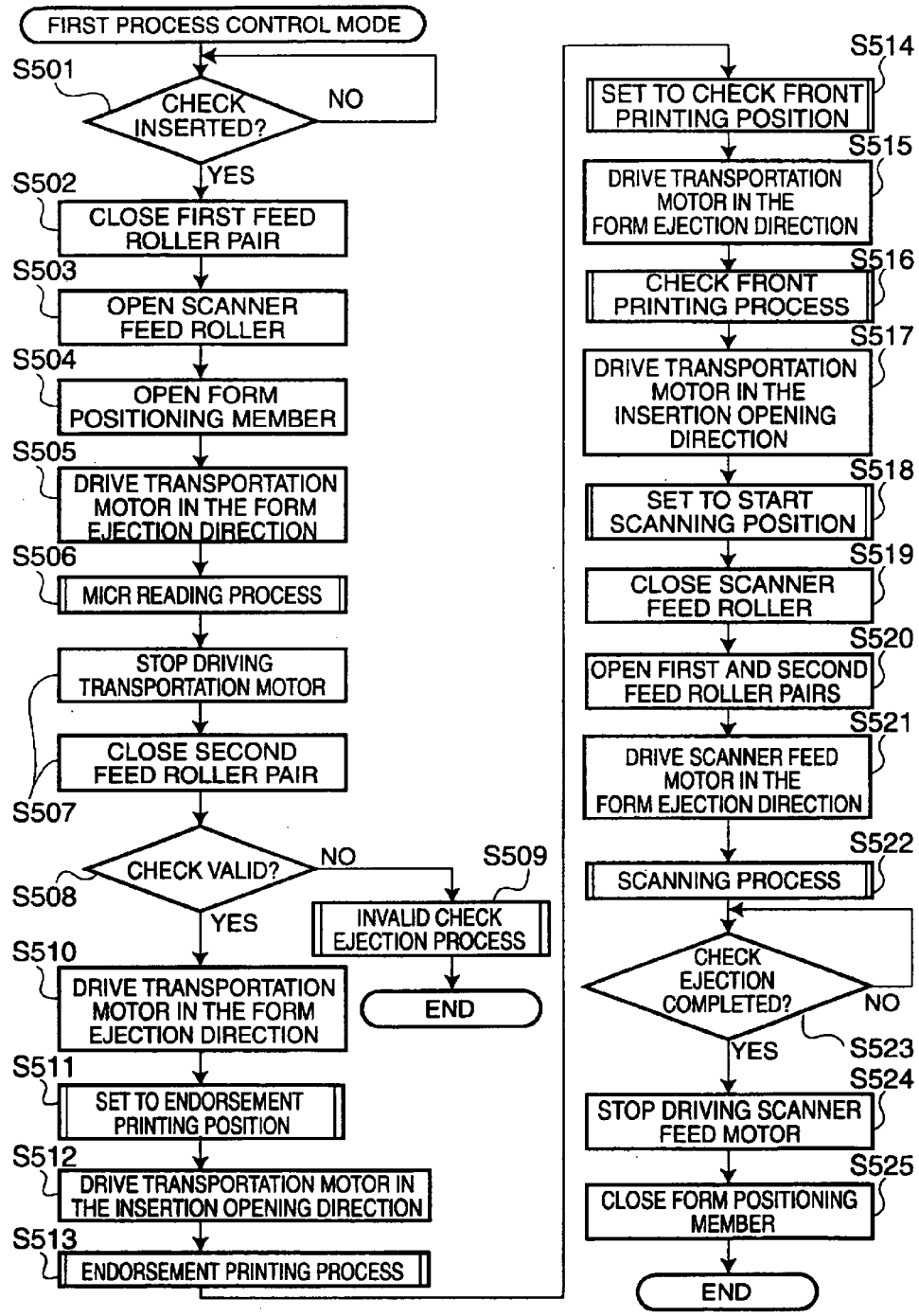
FIG. 5 is a flow chart showing the control sequence of the first process control mode.
Figure 6:
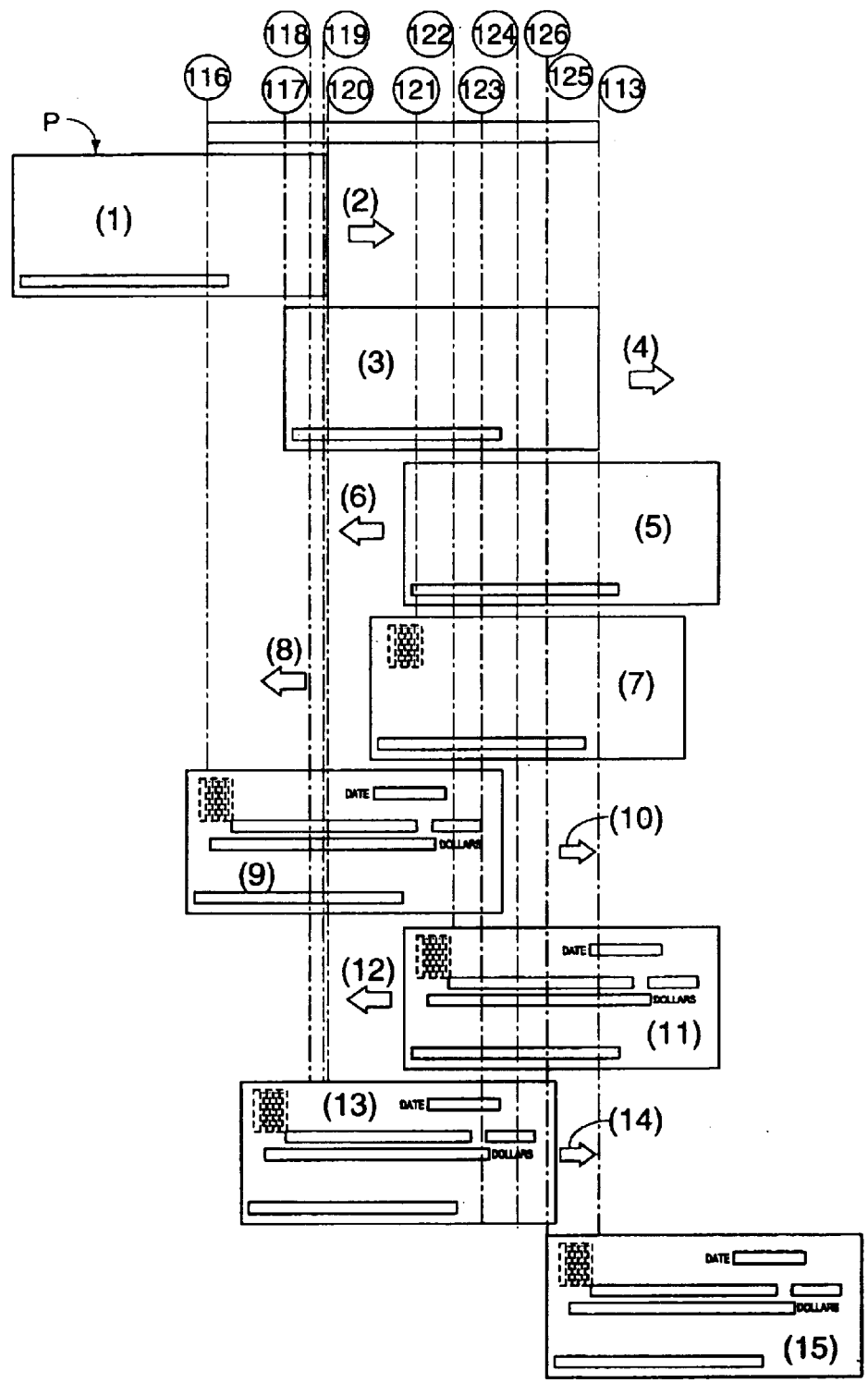
FIG. 6 illustrates operation in the first process control mode.

FIG. 5 is a flow chart showing the control sequence of the first process control mode, and FIG. 6 illustrates operation in the first process control mode. It should be noted that the numbers in circles shown in FIG. 6 correspond to the parts of the same numbers shown in FIG. 2, and indicate the position of those parts relative to a check P in the check transportation path 115.

As shown in the figures, the first step in the first process control mode is to wait for insertion of a check P (S501). During this time the first and second feed roller pairs 118, 122 are held open, and the form positioning member 120 and scanner feed roller 126 are held closed. Note that if operation was previously in the second process control mode, the scanner feed roller 126 is open.

When a check P is inserted from insertion opening 112, check insertion is detected from the detection signals output by trailing edge detector 116 and leading edge detector 119 (FIG. 6 (1)). When check insertion is detected, the first feed roller pair 118 closes (S502), the scanner feed roller 126 opens (S503), and the form positioning member 120 opens (S504). MICR text is then read with the magnetic head 117 (S506, FIG. 6 (2), (3)) while driving the transportation motor 133 in the form ejection direction (S505). After MICR reading, driving the transportation motor 133 stops (S507) and the second feed roller pair 122 closes. The data read with the magnetic head 117 is sent to a host computer for check verification. When the verification result is received from the host computer the result is evaluated (S508). If the check is invalid, an invalid check ejection process (S509) is run and the first process control mode ends.

If the check is valid, the transportation motor 166 is driven in the form ejection direction (S510) to set the check for endorsement printing on the check back (S511, FIG. 6 (4), (5)). The check is set to the endorsement printing position and to other various positions noted below by driving the transportation motor 133 a specified number of steps referenced to positions detected by the detectors 116, 119, 124 (including stopping form transport). When positioning for endorsement printing is completed the transportation motor 133 is driven in the insertion opening 112 direction (S512) while running the endorsement printing process with the back print head 121 (S513, FIG. 6 (6), (7)).

When endorsement printing is completed, the check is set to the front printing position (S514, FIG. 6 (8), (9)), and then while driving the transportation motor 133 in the form ejection direction (S515) the front of the check is printed using the front print head 123 (S516, FIG. 6 (10), (11)).

When the check front printing process is completed the transportation motor 133 is again driven in the insertion opening 112 direction (S517) to set the check to the start scanning position (S518, FIG. 6 (12), (13)). The scanner feed roller 126 is then closed (S519), and the first and second feed roller pairs 118, 122 are opened (S520). The scanning process (S522, FIG. 6 (14)) is then run while driving the scanner feed motor 132 in the form ejection direction (S521). The scanning process is described in detail further below.

A check ejection decision (S523) is then made after the scanning process ends. If the check was ejected (FIG. 6 (15)), driving the scanner feed motor 132 stops (S524), the form positioning member 120 is closed (S525), and the first process control mode ends.

It should be noted that by controlling the transportation motor 133 synchronized to the scanner feed speed in the first process control mode, the check can be transported to the end of the scanning process with the first and second feed roller pairs 118, 122 closed.

As noted above, the second process control mode differs from the first process control mode in that the scanning process is not run in the second process control mode. More specifically, the check continues to be transported toward the exit in the second process control mode after the check front printing process ends, and check ejection is evaluated. Driving the transportation motor 133 stops and the form positioning member 120 is set to the closed position when it is determined that the check has been ejected. Removal of the check is then determined based on a detection signal from the form ejection detector 124, and the first second roller pairs 118, 122 are opened and the second process control mode ends when it is determined that the check has been removed.

Figure 7:
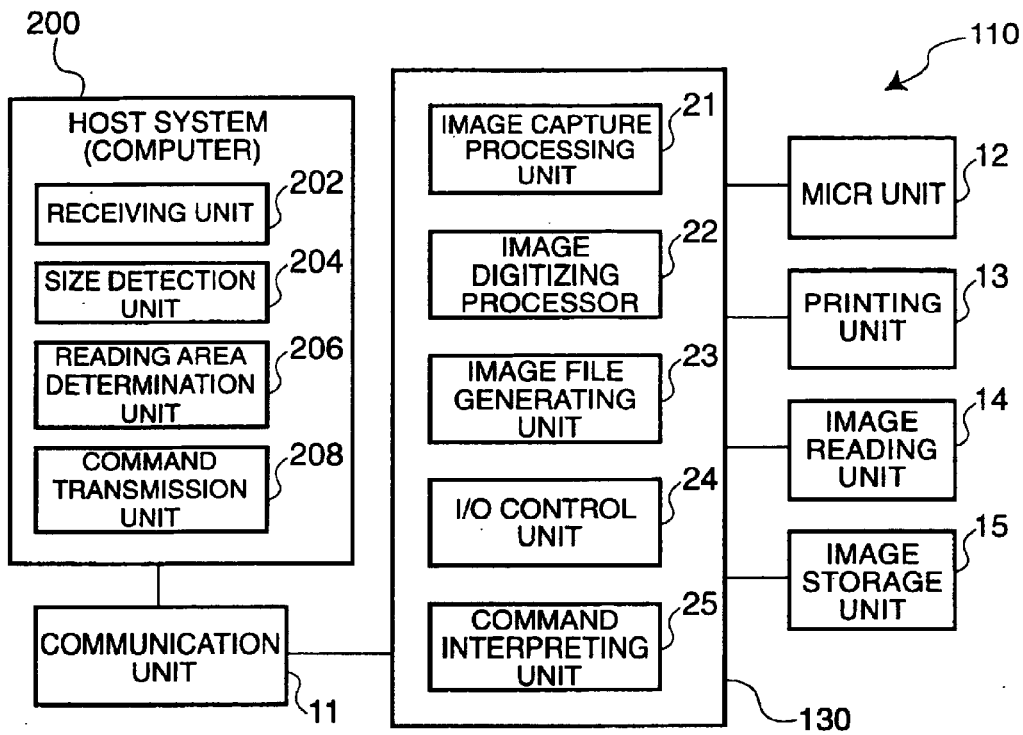
FIG. 7 is a function block diagram related to the scanning operation of the control unit.

FIG. 7 is a function block diagram related to the scanning operation of the control unit 130. The check processing apparatus 110 controls the MICR unit 12, printing unit 13, and image reading unit 14 to operate according to the control commands and print data received by the communication unit 11 from a host computer 200 (also referred to below as simply the "host"). The MICR unit 12 includes the above-noted magnetic head 117, pressure member 117a, first and second feed roller pairs 118, 122 and the first and second feed roller pair actuators 134, 135. The printing unit 13 includes the back print head 121, front print head 123, first and second feed roller pairs 118, 122, and first and second feed roller pair actuators 134, 135. The image reading unit 14 includes the scanner 125, scanner feed roller 126, scanner feed roller solenoid 131, and scanner feed motor 132.

The control unit 130 has an image capture processing unit 21, image digitizing processor 22, image file generating unit 23, I/O control unit 24, and command interpreting unit 25. The image capture processing unit 21 controls the image reading unit 14 to scan a particular scanning area and read in an image of the check. It also extracts only the gray scale image data in the cropping area from the gray scale image data output from the image reading unit 14. The image digitizing processor 22 then converts the gray scale image data to digital (binary) image data. The image file generating unit 23 then compresses the digital image data and converts it to an image file format, and stores the resulting image file in the image storage unit 15. The I/O control unit 24 controls the communication unit 11 to handle data communication between the check processing apparatus 110 and host 200. The command interpreting unit 25 interprets various control commands from the host. The host sends control commands such as basic operating parameter setting commands, MICR command, and check image reading command to the check processing apparatus 110. The image capture processing unit 21 is described in further detail below.

Figure 8:
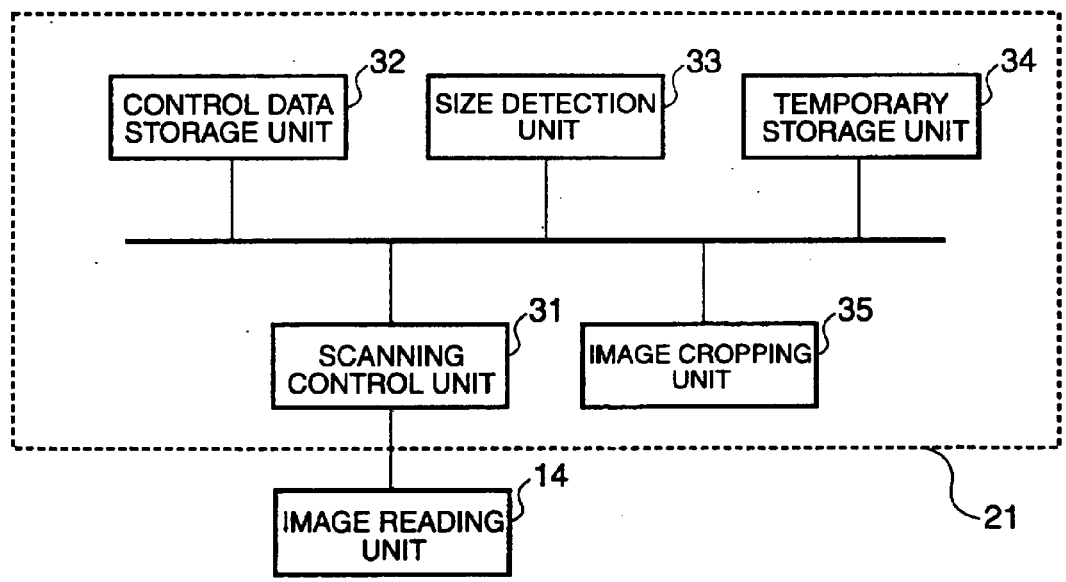
FIG. 8 is a function block diagram of the image capture processing unit.

FIG. 8 is a block diagram of the image capture processing unit 21. The image capture processing unit 21 has a scanning control unit 31, control data storage unit 32, size detection unit 33, temporary storage unit 34, and image cropping unit 35. As further described below the control data storage unit 32 stores the operating parameters passed from the command interpreting unit 25 and relating to the reading area, cropping area, and other aspects of the scanning operation.

The scanning control unit 31 reads the operating parameters stored in the control data storage unit 32 in the scanning start position indexing process (S518) and scanning process (S522). Based on these settings the scanning control unit 31 transports the check to the scanning start position by controlling the transportation motor 133 to drive the first and second feed roller pairs 118, 122 in the appropriate directions, and controls driving the image reading unit 14 to read an image of the check and store the captured digital image data in the temporary storage unit 34. During the scanning process (S522) the image cropping unit 35 reads the operating parameters stored in the control data storage unit 32, and based on these settings extracts only the image data inside the defined cropping area from the check image stored in the temporary storage unit 34, and stores the cropped image data back into the temporary storage unit 34.

The scanning control unit 31 can also automatically set the image reading area based on the check size information detected by the check size detection unit 33. If the scanner feed roller 126 opposite the scanning surface of the scanner 125 is a blackish color, the image around the outside edges of a scanned check will be black and the size of the check can then be easily detected from the image data stored in the temporary storage unit 34.

More specifically, the edges of a check can be detected by finding a line having a certain minimum length of black-towhite and white-to-black transition points in the image. These edge lines can then be used to detect the position of the check in the stored image data and the size of the check. More particularly, if the top edge and one side edge of the check can be substantially aligned to the readable area of the image reading unit 14 due to the construction of the check processing apparatus 110, the bottom edge of the check can be identified as the point in the transportation direction where white data changes to black data and the line of white/black data points continues for a specified distance, and the transition points in the direction perpendicular to the transportation direction can be identified as the other side edge. It will be noted that an image reading process for size detection is needed if the image reading area is automatically set by thus detecting the size of the check. It will also be noted that the length in the direction orthogonal to the check transportation direction can be detected in this method simultaneously to the provisional scanning process (S201) further described below.

The size detection unit 33 can also detect the length of the check in the transportation direction based on detection signals output from the form trailing edge detector 116 and form leading edge detector 119 and the number of steps the transportation motor 133 is driven. More specifically, the length in the transportation direction of the check can be detected by obtaining the sum of the transportation distance from where the form leading edge detector 119 detects the leading edge of the check to where the form trailing edge detector 116 detects the trailing edge, and the length of the transportation path between the form trailing edge detector 116 and form leading edge detector 119. Using this method the length of the check in the transportation direction can be detected simultaneously to the MICR process (S506), for example.

Figure 9:
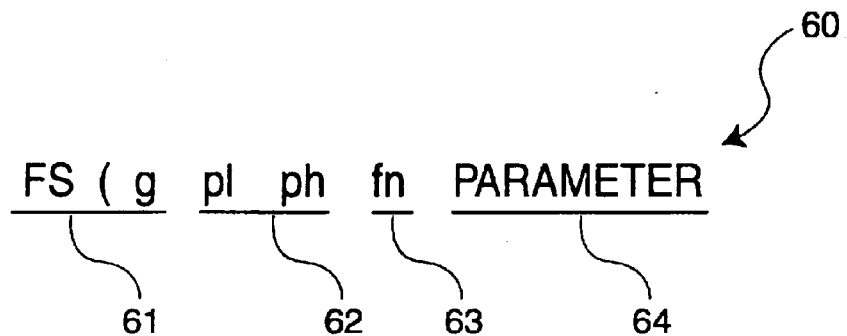
FIG. 9 shows the format of a typical scanning process setup command.

FIG. 9 shows a typical scanning process setup command 60. This scanning process setup command 60 includes a command code ("FS(g") 61, parameter length ("pl ph") 62, function code ("fn") 63, and parameter 64.

The command code 61 "FS(g" is the ASCII expression for the hex code <1C 28 67>, and indicates that the following command sets the image data processing method. The parameter length 62 denotes the total length of the following function code 63 and parameter 64, and the total command length is denoted as (pl+ph×256) bytes. The function code 63 specifies the function of the scanning process setup command 60, and the parameter 64 holds the parameters required for the function indicated by the function code 63. Some functions of the scanning process setup command 60 are described next below.

The function code fn=41 sets the image reading area. Parameters x1 and y1 specify the x and y coordinates for the starting point of the reading area, and parameters x2 and y2 specify the x and y coordinates for the end point. Parameters x1, y1, x2, y2 are each one byte long and indicate the reading area using a unit of length such as millimeters, for example. Note that the y-axis is the transportation direction of the check and the x-axis is orthogonal to the transportation direction. If x2=0 or y2=0 the end point in the x or y direction is set according to the size information from the size detection unit 33. Setting x2=0 or y2=0 could also be used to set the end points in the x or y direction to the maximum size of the readable area. If x2 or y2 is set to a point outside the readable area, the corresponding end point in the x or y direction is set to the maximum size of the readable area. The image reading area settings are then stored in the control data storage unit 32.

Figure 10:
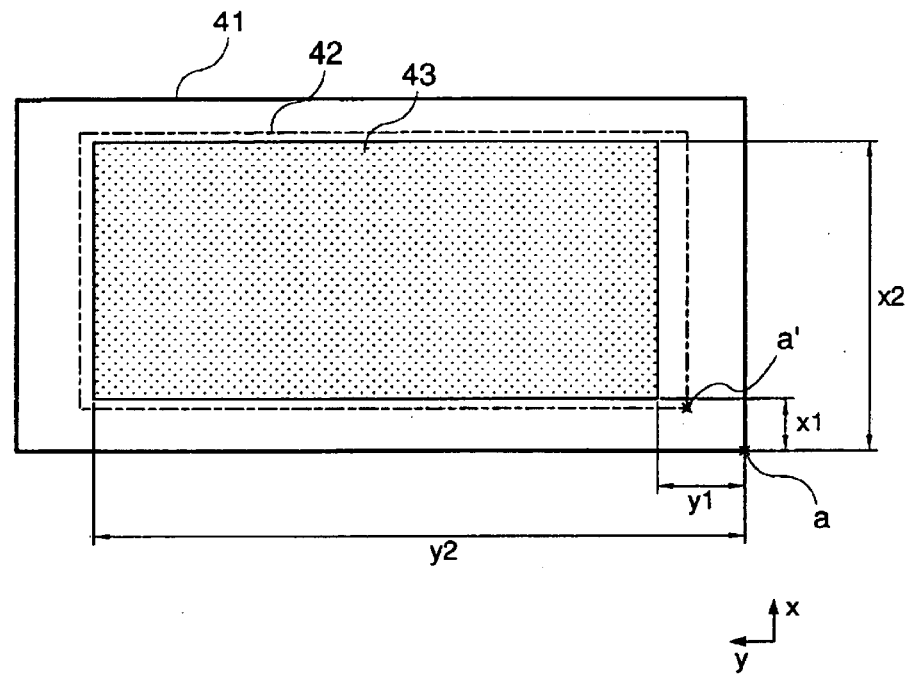
FIG. 10 shows a typical reading area.

FIG. 10 shows the readable area, and more specifically shows the relationship between the readable area 41 of the image reading unit 14, the check size 42, and the image reading area 43 set by the scanning process setup command 60. Reference "a" is the origin for one edge of the readable area 41 and the base point for reading area points x1, x2, y1, y2, and is determined by the structure of the check processing apparatus 110. The check processing apparatus 110 is preferably configured so that edge a' of the check matches base point "a". It is also possible to use edge a' of the scanned check or other negotiable instrument as base point "a". As shown in the figure, the reading area is the area (shaded in the figure) defined by coordinates (x1, y1), (x2, y1), (x1, y2), (x2, y2), which are represented as distances from base point "a" on the respective x and y axes.

The function code fn=42 sets the cropping area. Cropping deletes all data outside a specified cropping area, leaving only the data inside the cropping area. It is also possible to reverse this operation so that the data inside the cropping area is deleted, leaving only the data outside the cropping area. This cropping process can be used to reduce the data size of the image. Parameter n indicates the cropping area number. Parameters (x1, y1) and (x2, y2) determine the start and end points of the cropping area similarly to defining the reading area as the distance (mm) from base point "a". If x2 or y2 is set to a point outside the readable area, the corresponding end point in the x or y direction is set to the maximum size of the readable area. If part of the cropping area is set outside the reading area, the valid cropping area is preferably set to only the area overlapping the reading area. The cropping area settings are stored in the control data storage unit 32 linked to a cropping area number that represents a particular area on the negotiable instrument, and which is passed in parameter n. If the cropping area number passed in parameter n already exists, the setting is overwritten.

Figure 11:
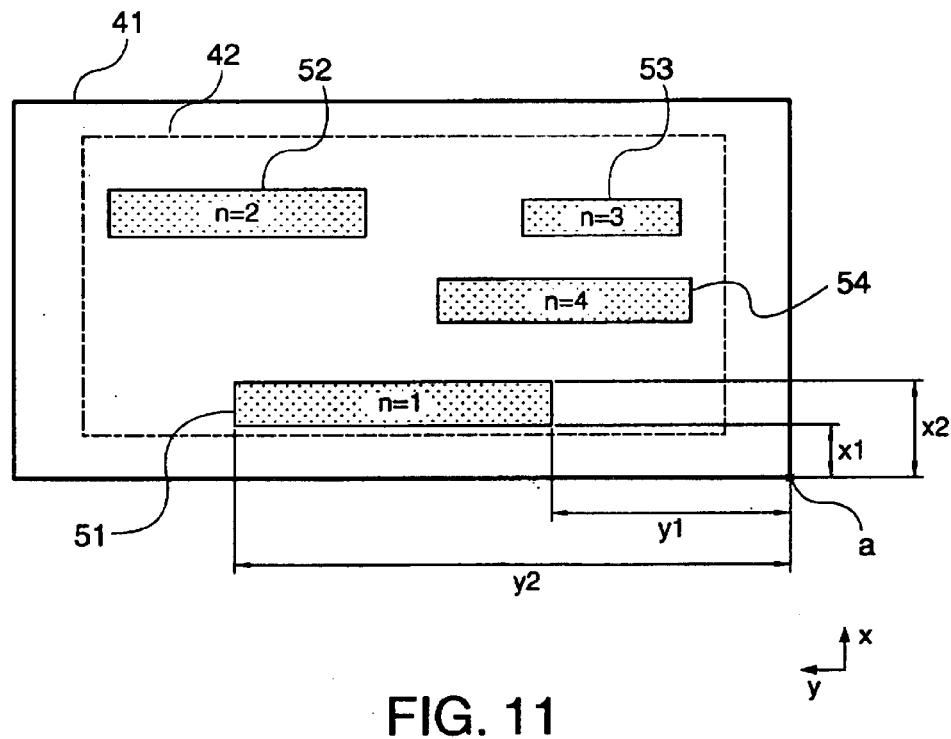
FIG. 11 shows typical cropping areas.

FIG. 11 shows some possible cropping areas in a check with the magnetic ink character recording area 127 and check face printing areas 128 defined as cropping areas. More specifically, this example shows magnetic ink character area 51 (cropping area number n=1), payee area 52 (n=2), payment amount area 53 (n=3), and signature area 54 (n=4) defined as cropping areas.

Function code fn=43 clears the cropping area passed as parameter n. If cropping area number n=0, all cropping areas are cleared.

Function code fn=44 sets the image data compression method. Parameter m specifies the compression method (including no compression), and parameter n indicates the image data file type or compression rate. Compression methods denoted by parameter m include, for example, no compression, CCITT compression, or JPEG compression. File formats specifiable by parameter n include unformatted (raster data), BMP, and TIFF. If JPEG compression, for example, is specified by parameter m, parameter n specifies the compression rate as high, normal, or low. The compression method settings are then stored in control data storage unit 32.

Function codes fn=45 to 47 pass the reading area settings, cropping area settings, and compression method settings to the host computer 200 according to a specified communication data format.

The scanning process setup is described next.

Figure 12:
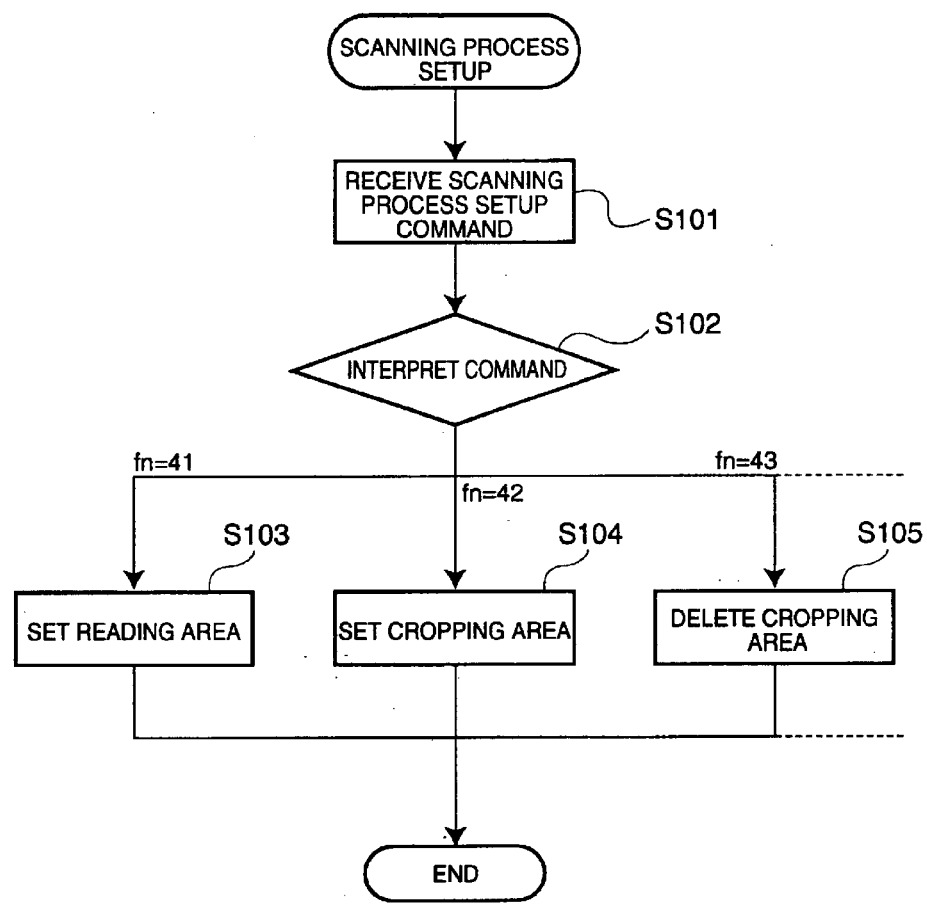
FIG. 12 is a flow chart of the control steps for setting up the scanning process.

FIG. 12 is a flow chart of the control procedure for setting up the scanning process. The scanning process conditions are set according to the scanning process setup command 60 from the host 200 as described above. When the scanning process setup command 60 is received from the host by the communication unit 11 (S101), the command interpreting unit 25 interprets the scanning process setup command 60 (S102) and detects the function code. If the function code fn=41, the reading area is set according to parameters x1, x2, y1, y2 (S103). If the function code fn=42, the cropping area is set according to parameters x1, x2, y1, y2 (S104). If the function code fn=43, the settings for the cropping area specified by parameter n are cleared (S105). While not shown in the figure the other function codes fn are similarly interpreted to set the compression method or read and send the specified settings from the control data storage unit 32 to the host appropriately according to the function code fn.

The scanning process is described next.

Figure 13:
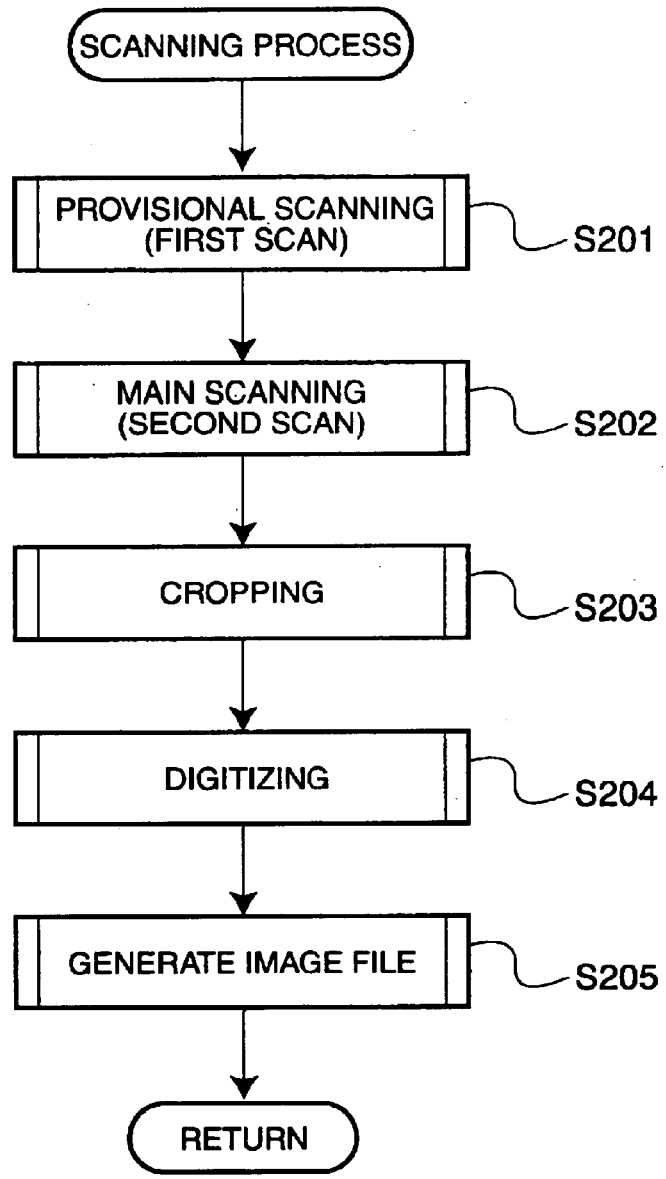
FIG. 13 is a flow chart of the scanning process control steps.

FIG. 13 is a flow chart of the scanning process control steps. The first step is to scan part of the check (provisional scanning or first scan) and capture gray scale image data from the check in the provisional scanning area, and then determine the threshold value for the digitizing (binarizing) process based on the captured gray scale image data (S201). The reading area set according to the scanning process setup command 60 is then scanned to capture a gray scale image of the check face (S202). Gray scale image data from the cropping area set by the scanning process setup command 60 is then extracted from the gray scale image data in the reading area (S203), and the extracted image data is then digitized (binarized) using the threshold value set in the provisional scanning process to generate digital image data (S204). The resulting digital image data is then converted to an image file based on the compression method and file format settings of the scanning process setup command 60 (S205) and sent to the host 200. The host stores the received image data together with the electronic payment data in a searchable format in the image storage device of the host, and sends it to the financial institution for clearing. Note that the image digitizing unit and the provisional scanning (S201) and digitizing (S204) steps executed by the image digitizing unit are only required when digital image data is generated.

Scanning for the check image reading process is described next.

Figure 14:
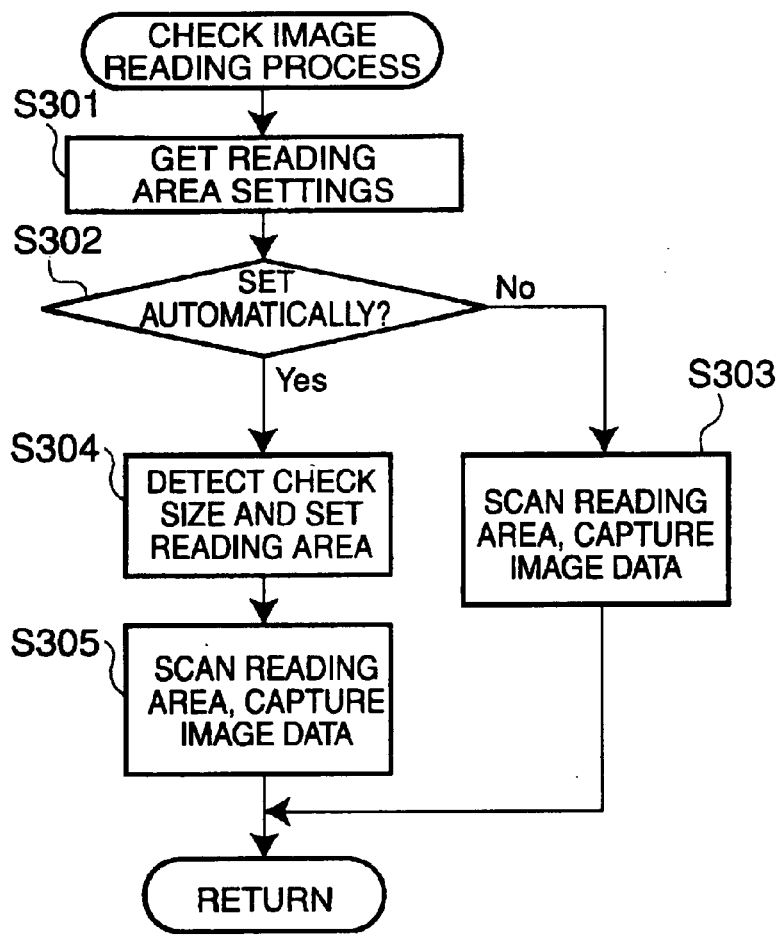
FIG. 14 is a flow chart of the control steps in the process for reading a check image in a final scanning operation.

FIG. 14 is a flow chart of the control steps in the process for reading a check image in a final scanning operation. The reading area settings are read from the control data storage unit 32 by the scanning control unit 31 of image capture processing unit 21 (S301), and whether the settings are automatically set is then determined (S302). If not automatically set, the image reading unit 14 is controlled to scan the reading area specified by the reading area settings to capture the image data (S303). If the reading area setting is for automatic setting, the size detection unit 33 detects the check size to set the reading area to the check size (S304). The image reading unit 14 is then controlled to scan and capture image data from the automatically set reading area (S305). The image data read in steps S303 and S305 is temporarily stored in the temporary storage unit 34. It should be noted that the check size detection process in step S304 can, as noted above, be run simultaneously with the provisional scanning (S201) and MICR (S506) processes so that the check size is detected before the final scanning process (second scan) (S202).

The cropping process is described next.

Figure 15:
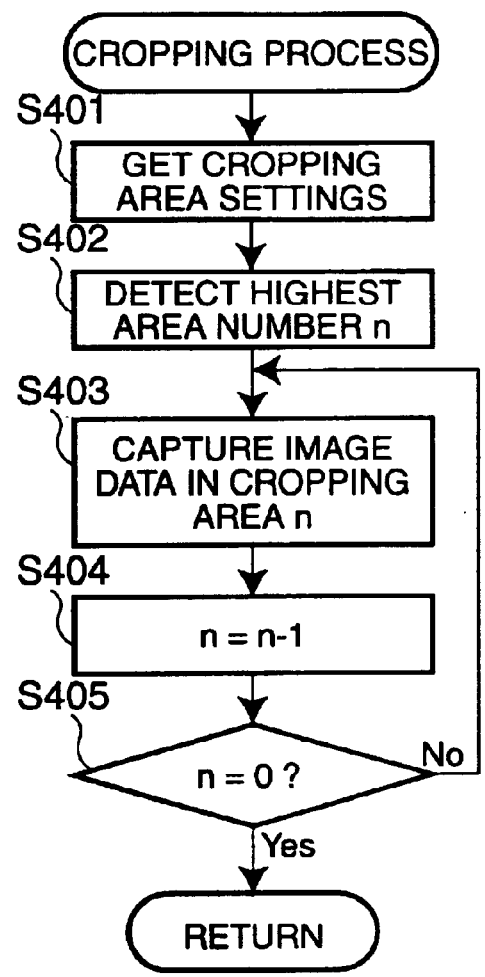
FIG. 15 is a flow chart of the control steps in the cropping process.

FIG. 15 is a flow chart of the control steps in the cropping process. As described above, the image cropping unit 35 of image capture processing unit 21 reads the cropping area settings from the control data storage unit 32 (S401), and detects and sets the value of the highest cropping area number n in a counter (S402). Image data stored in the temporary storage unit 34 by the check image reading process described above is then read, image data from inside the cropping area corresponding to the area number n indicated by the counter is then captured from the image data (S403), and the counter is decremented by one (S404). Steps S403 and S404 then repeat until n=0 (S405), that is, until image data has been captured from all of the selected cropping areas. The image data captured in step S403 is then temporarily stored in the temporary storage unit 34 linked with area number n.

An embodiment of an image capturing system is described next.

Figure 16:
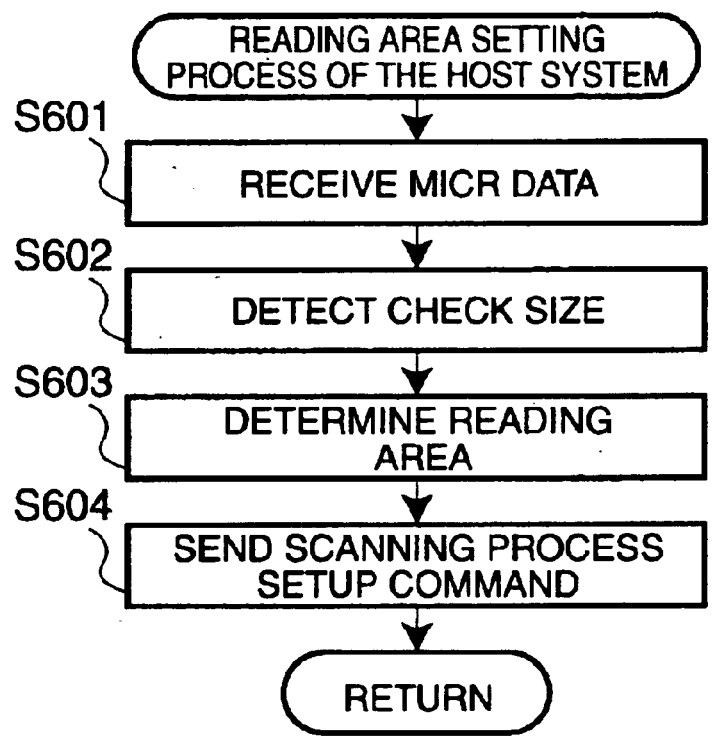
FIG. 16 is a flow chart of the control steps in a reading area setting process executed by the host computer.

FIG. 16 is a flow chart of the control steps in a reading area setting process executed by the host computer 200 (FIG. 7). The receiving unit 202 of the host computer receives the data from the magnetic ink characters on the check (S601) read during the MICR process (S506) executed by the check processing apparatus 110. Based on the received read data, the host computer determines whether a check is valid or not and the size determination unit 204 specifies the check size (S602). There are two basic types of checks, personal and business, which differ primarily in size. The format of the MICR data preprinted on the checks is also standardized, and consists of several defined fields. Whether a check is a personal or business check can be determined by the size determination unit 204 by detecting the presence of a specific field (known as the "Auxiliary On Us Field"). If this field is present, the check is a business check; if not, the check is a personal check. An appropriate reading area is set (S603) by the reading area determination unit 206 according to the identified check size, and the scanning process setup command 60 with the reading area specified using function code fn=41 is sent by the command transmission unit 208 to the check processing apparatus 110 (S604). The host computer 200 can set the reading area to the same size as the check, or to a smaller area removing white space from the area of the check size.

It will thus be appreciated that the present invention can reduce the image reading time and size of the captured image data by scanning and reading check image data only from specified reading areas and then extracting image data from within specified cropping areas. The size of the image data can then be further reduced by digitizing (binarizing) and compressing the image data.

Although the present invention has been described in connection with the preferred embodiments thereof with reference to the accompanying drawings, it is to be noted that various changes and modifications will be apparent to those skilled in the art. For example, the reading and cropping areas are set to the required areas for check processing in the preferred embodiments described above, but the areas that are not needed for such processing could be alternatively set, e.g. visible watermarks on negotiable instruments may be a key area that must be scanned for authentication. Furthermore, the reading and cropping areas are set according to control commands from a host computer, but they could be set with switches and keys on the check processing apparatus. The scanner could also be a self-drive type and scanner output could be color, gray scale data, or two-value data. Such changes and modifications are to be understood as included within the scope of the present invention as defined by the appended claims, unless they depart therefrom.

What is claimed is:

1. A negotiable instrument processing apparatus comprising:

an image reading unit that scans a negotiable instrument, captures an image the negotiable instrument, and outputs image data;

a size detection unit that detects a size of the negotiable instrument;

a reading area setting unit that is responsive to a first input to set a reading area for scanning by the image reading unit, the first input
- (a) directly setting the reading area according to parameters representing x and y coordinates values specified by the first input without detecting the size of the negotiable instrument by the size detecting unit when the parameters equal first values, and
- (b) automatically setting the reading area according to the size detected by the size detection unit when the parameters equal second values; and a scanning control unit that controls driving the image reading unit according to the reading area.

2. The apparatus of claim 1, wherein the first input is a first control command from a host system.

3. The apparatus of claim 1, wherein the reading area set by the reading area setting unit is rectangular, and the reading area setting unit sets the reading area based on a starting point and ending point specified by the first input at diagonally opposite corners of the rectangle.

4. The apparatus of claim 3, wherein the starting point and ending point specified by the first input are specified as coordinates of an orthogonal coordinate system of which a first axis is a direction of negotiable instrument movement relative to the image reading unit and a second axis is a direction orthogonal to the direction of relative movement.

5. The apparatus of claim 1, wherein the size detection unit detects at least a length of the negotiable instrument in a direction orthogonal to a direction of movement of the negotiable instrument relative to the image reading unit based on the image data output from the image reading unit.

6. The apparatus of claim 1, further comprising a transportation unit that conveys the negotiable instrument along a transportation path; and
- first and second paper detection units positioned along the transportation path with a specific interval therebetween that detect presence of a negotiable instrument in the transportation path;
- the size detection unit further detecting negotiable instrument length in the transportation direction based on the specific interval, information relating to the transportation distance from the transportation unit, and detection information from the paper detection units.

7. The apparatus of claim 1, further comprising a cropping area setting unit that is responsive to a second input to set at least one cropping area for capturing a part of the image data; and
- an image cropping unit that captures data within the at least one cropping area from the image data.

8. The apparatus of claim 7, wherein the second input is a second control command from the host system.

9. The apparatus of claim 7, wherein a cropping area set by the cropping area setting unit is rectangular, and the cropping area setting unit sets the cropping area based on a starting point and ending point specified by the second input at diagonally opposite corners of the rectangle.

10. The apparatus of claim 7, wherein the starting point and ending point specified by the second input are specified as coordinates of an orthogonal coordinate system of which a first axis is a direction of negotiable instrument movement relative to the image reading unit and a second axis is a direction orthogonal to the direction of relative movement.

11. The apparatus of claim 7, wherein the cropping area setting unit deletes a cropping area based on a third input.

12. The apparatus of claim 11, wherein the third input is a third control command from the host system.

13. A negotiable instrument processing method comprising:

receiving a first input, the first input
- (a) directly setting a reading area for capturing an image of the negotiable instrument according to parameters representing x and y coordinate values specific by the first input without detecting a size of the negotiable instrument when the parameters equal first values, and
- (b) detecting a size of the negotiable instrument and automatically setting the reading area for capturing an image of the negotiable instrument according to the size detected when the parameters equal second values;

setting the reading area based on
- reading area settings specified by x and y coordinate values received in the first input receiving step if directly setting is specified by the first input, and
- the size detected by the size detection unit if automatic setting is specific by the first input; and scanning a negotiable instrument, capturing an image thereof, and outputting image data based on the reading area set in the reading area setting step.

14. The method of claim 13, further comprising receiving a second input, the second input including cropping area settings specifying at least one cropping area for capturing a part of the image data output in the image reading step;
- setting a cropping area based on the cropping area settings input in the second input step; and
- capturing data within the cropping area from the image data output in the scanning, capturing and outputting step.

15. The method of claim 14, further comprising receiving a third input, the third input including a cropping area deletion instruction for deleting a cropping area; and
- deleting a cropping area based on the cropping area deletion instruction.

* * * * *

UNITED STATES PATENT AND TRADEMARK OFFICE
CERTIFICATE OF CORRECTION

PATENT NO. : 6,902,105 B2  
DATED : June 7, 2005  
INVENTOR(S) : Naohiko Koakutsu It is certified that error appears in the above-identified patent and that said Letters Patent is hereby corrected as shown below:

Column 13,
Line 2, please change "an image the" to -- an image of the --.

Signed and Sealed this

Twenty-fifth Day of October, 2005

JON W. DUDAS
*Director of the United States Patent and Trademark Office*